United States Patent
Togano et al.

(10) Patent No.: US 9,488,387 B2
(45) Date of Patent: Nov. 8, 2016

(54) HEAT-SOURCE SELECTING DEVICE FOR HEAT SOURCE SYSTEM, METHOD THEREOF, AND HEAT SOURCE SYSTEM

(71) Applicant: MITSUBISHI HEAVY INDUSTRIES, LTD., Tokyo (JP)

(72) Inventors: Yoshie Togano, Tokyo (JP); Kenji Ueda, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 595 days.

(21) Appl. No.: 13/914,163

(22) Filed: Jun. 10, 2013

(65) Prior Publication Data

US 2013/0330679 A1    Dec. 12, 2013

(30) Foreign Application Priority Data

Jun. 12, 2012 (JP) ................................. 2012-133057

(51) Int. Cl.
 *F24J 3/00* (2006.01)
 *F24J 3/06* (2006.01)
 *F28D 21/00* (2006.01)

(52) U.S. Cl.
 CPC .. *F24J 3/00* (2013.01); *F24J 3/06* (2013.01); *F28D 21/0012* (2013.01); *F24J 2200/00* (2013.01); *F28F 2200/00* (2013.01); *Y02B 30/566* (2013.01)

(58) Field of Classification Search
 CPC ..................................... F24J 3/00; F24J 3/06
 See application file for complete search history.

(56) References Cited

U.S. PATENT DOCUMENTS 5,435,380 A * 7/1995 Yamada ................ F24F 5/0017
165/104.19
2009/0288437 A1* 11/2009 Matsuoka ................. F24F 3/06
62/238.6

(Continued)

FOREIGN PATENT DOCUMENTS

JP    11-211270 A    8/1999
JP    2001-132989 A    5/2001

(Continued)

OTHER PUBLICATIONS

Office Action dated May 10, 2016, issued in counterpart Japanese Patent Application No. 2012-133057, with English translation. (9 pages).

(Continued)

*Primary Examiner* — Alissa Tompkins
*Assistant Examiner* — Nathaniel Herzfeld
(74) *Attorney, Agent, or Firm* — Westerman, Hattori, Daniels & Adrian, LLP

(57) ABSTRACT

A heat source system has a plurality of heat sources that can be utilized therein. The plurality of heat sources include unused heat such as sewage and wastewater generated in a facility in which an external load that receives a supply of heating medium heated or cooled by using the heat sources is installed. A system control device (10) of the heat source system determines potential temperatures and amounts of potential heat of the individual heat sources; and selects heat sources based on the potential temperatures and the amounts of potential heat.

14 Claims, 10 Drawing Sheets

(56) References Cited

U.S. PATENT DOCUMENTS

| | | | | |
|---|---|---|---|---|
| 2011/0226447 | A1* | 9/2011 | Mieda | F28D 7/022 165/104.12 |
| 2011/0289952 | A1* | 12/2011 | Kim | F24D 11/0214 62/189 |
| 2012/0168114 | A1* | 7/2012 | Uhrig | E03F 7/00 165/11.1 |
| 2012/0204588 | A1* | 8/2012 | Takenaka | F25B 29/003 62/238.7 |
| 2013/0205824 | A1* | 8/2013 | Morimoto | F25B 7/00 62/324.6 |
| 2013/0219936 | A1* | 8/2013 | Yamamoto | F24F 11/02 62/126 |
| 2013/0312438 | A1* | 11/2013 | Kudo | F25B 1/02 62/84 |
| 2014/0345310 | A1* | 11/2014 | Tamaki | F25B 13/00 62/238.6 |

FOREIGN PATENT DOCUMENTS

| | | |
|---|---|---|
| JP | 2002-89995 A | 3/2002 |
| JP | 2005-315476 A | 11/2005 |
| JP | 2009-168256 A | 7/2009 |
| JP | 2009-236424 A | 10/2009 |
| JP | 2011-52942 A | 3/2011 |

OTHER PUBLICATIONS

Decision to Grant a Patent dated Aug. 9, 2016, issued in counterpart Japanese Patent Application No. 2012-133057. (3 pages). Explanation of Relevance—"The Decision to Grant a Patent has been received."

* cited by examiner

HEAT-SOURCE SELECTING DEVICE FOR HEAT SOURCE SYSTEM, METHOD THEREOF, AND HEAT SOURCE SYSTEM

CROSS-REFERENCE TO RELATED APPLICATIONS

This application is based on Japanese Patent Application No. 2012-133057, the contents of which are incorporated herein by reference.

TECHNICAL FIELD

The present invention relates to a heat-source selecting device for a heat source system in which a plurality of heat sources can be utilized, a method thereof, and a heat source system.

BACKGROUND ART

In the related art, in a heat source system for air-conditioning equipment, hot-water supplying equipment, and so forth, heat is exhausted and taken in by mainly using the atmosphere as a heat source. For example, in the case of air-conditioning equipment, heat is exhausted into the atmosphere at a cooling tower during cooling operation, and heat exchange is performed with the atmosphere by using an air heat exchanger during heating operation.

CITATION LIST

Patent Literature

{PTL 1} Japanese Unexamined Patent Application, Publication No. 2011-52942
{PTL 2} Japanese Unexamined Patent Application, Publication No. 2009-236424

SUMMARY OF INVENTION

Technical Problem

In recent years, environmentally friendly city development has been promoted from the viewpoint of environmental load and so forth, and systems that facilitate the introduction of sewage heat utilization are being developed. With heat source systems for air-conditioning equipment and so forth, it has also been proposed to introduce unused heat of sewage and so forth as a new form of heat source.

Furthermore, in addition to the unused heat utilization described above, in the urban areas or the like, wastewater heat discharged from facilities (for example, offices, commercial facilities, lodging facilities, and so forth) is starting to attract attention as a new heat source, and there is an expectation that the range of selectable heat sources will expand.

An object of the present invention is to provide a heat-source selecting device for a heat source system in which exhaust heat generated in a facility can be introduced as a heat source, and the heat sources can effectively be utilized, to provide a method thereof, and to provide a heat source system.

Solution to Problem

A first aspect of the present invention is a heat-source selecting device that is employed in a heat source system in which a plurality of heat sources can be utilized and that selects a heat source to be used, wherein the plurality of heat sources include unused heat such as sewage, river water, groundwater, well water, sea water, lake water, and so forth, and wastewater generated in a facility in which an external load that receives a supply of heating medium heated or cooled in the heat source system is installed, the heat-source selecting device including a potential determining portion for determining potential temperatures that serve as evaluated values retalted to temperatures of the individual heat sources and amounts of potential heat that serve as evaluated values related to amounts of heat of the individual heat sources; and a judging portion for identifying heat sources having the amounts of potential heat higher than a threshold set in advance; for selecting, from among the identified heat sources, the heat source having the highest potential temperature, in the case of heating purposes; and for selecting, from among the identified heat sources, the heat source having the lowest potential temperature, in the case of cooling purposes.

With this aspect, the plurality of heat sources are included, and the heating medium is heated or cooled by using at least one of these heat sources. These heat sources include the unused heat such as sewage or the like and the heat possessed by the wastewater generated in the facility in which the external load supplied with the heating medium heated or cooled in the heat source system is installed. Therefore, in addition to the unused heat such as sewage or the like, the heat generated in the facility can also be used effectively as a heat source for the heat source system. In addition, when selecting the heat source, in case of heating purposes, the potential temperatures that serve as evaluated values related to the temperatures of the individual heat sources and the amounts of potential heat that serve as evaluated values related to the amounts of heat thereof are determined, and the heat source to be used is selected based on them. When selecting the heat source, it is preferable that a heat source having a higher potential temperature be used. This is because a greater reduction is achieved in terms of energy consumption when the heat source temperature is closer to a target temperature of the heating medium in the heat source unit. However, if the amount of potential heat is low, a shift to an additional heat source is inevitable due to a lack of an amount of heat, even if the potential temperature is high. Because of this, whether or not the minimum necessary amount of potential heat is ensured is included as a decision making factor, and a heat source having the most suitable potential temperature in accordance with the usage is selected from among the heat sources having higher amounts of potential heat than a threshold determined based on the minimum necessary amount of potential heat. The threshold may be a fixed value or values calculated from time to time based on heat demand.

With this aspect, miscellaneous wastewater generated in the facility is used as one of the heat sources. The effectiveness of the miscellaneous wastewater generated in the facility as a heat source will be discussed below.

For example, assuming a relatively large lodging facility having 30 above-ground floors, three underground floors, and about 700 guest rooms, water budget statistics of such a facility show that the amount of miscellaneous wastewater discharged from the guest rooms and so forth reaches about 350 m$^3$ per day or more.

Tables 1 and 2 show changes in flow rates at various times of the day, assuming the amount of miscellaneous wastewater generated in the facility to be 350 m$^3$ per day based on the statistics. Table 1 shows a comparison between the amount of potential heat of the sewage and the amount of potential heat of the miscellaneous wastewater during summer, and Table 2 shows a comparison between the amount of potential heat of the sewage and the amount of potential heat of the miscellaneous wastewater during winter. In Tables 1 and 2, an average value of actual measurements in urban areas is used as the flow rate of the sewage, thus excluding flow-rate fluctuations. In addition, because the flow rates of the miscellaneous wastewater depend on the amount of hot water use, the flow rates for different times are determined in accordance with hourly hot-water supply load proportions provided by the Society of Heating, Air-conditioning, and Sanitary Engineers of Japan.

TABLE 1

| | SUMMER | | | | |
|---|---|---|---|---|---|
| | SEWAGE | | MISCELLANEOUS WASTEWATER | | |
| TIME OF DAY h | FLOW RATE m3/h | AMOUNT OF POTENTIAL HEAT kWh | FLOW RATE m3/h | AMOUNT OF POTENTIAL HEAT kWh | HOURLY PROPORTION % |
| 1 | 600 | 15352 | 8.3 | 260 | 2.37 |
| 2 | 600 | 15352 | 5.0 | 157 | 1.43 |
| 3 | 600 | 15352 | 2.2 | 70 | 0.64 |
| 4 | 600 | 15352 | 1.3 | 42 | 0.38 |
| 5 | 600 | 15352 | 2.6 | 80 | 0.73 |
| 6 | 600 | 15352 | 8.2 | 258 | 2.35 |
| 7 | 600 | 15352 | 16.2 | 510 | 4.64 |
| 8 | 600 | 15352 | 15.9 | 498 | 4.53 |
| 9 | 600 | 15352 | 13.9 | 436 | 3.97 |
| 10 | 600 | 15352 | 13.3 | 418 | 3.80 |
| 11 | 600 | 15352 | 15.8 | 496 | 4.51 |
| 12 | 600 | 15352 | 11.4 | 357 | 3.25 |
| 13 | 600 | 15352 | 12.6 | 395 | 3.59 |
| 14 | 600 | 15352 | 14.3 | 448 | 4.08 |
| 15 | 600 | 15352 | 13.3 | 418 | 3.80 |
| 16 | 600 | 15352 | 13.8 | 434 | 3.95 |
| 17 | 600 | 15352 | 14.8 | 465 | 4.23 |
| 18 | 600 | 15352 | 16.4 | 514 | 4.68 |
| 19 | 600 | 15352 | 18.8 | 589 | 5.36 |
| 20 | 600 | 15352 | 26.2 | 822 | 7.48 |
| 21 | 600 | 15352 | 30.0 | 942 | 8.57 |
| 22 | 600 | 15352 | 31.4 | 986 | 8.97 |
| 23 | 600 | 15352 | 27.1 | 850 | 7.73 |
| 24 | 600 | 15352 | 17.4 | 545 | 4.96 |

TABLE 2

| | WINTER | | | | |
|---|---|---|---|---|---|
| | SEWAGE | | MISCELLANEOUS WASTEWATER | | |
| TIME OF DAY h | FLOW RATE m3/h | AMOUNT OF POTENTIAL HEAT kWh | FLOW RATE m3/h | AMOUNT OF POTENTIAL HEAT kWh | HOURLY PROPORTION % |
| 1 | 600 | 8374 | 8.3 | 260 | 2.37 |
| 2 | 600 | 8374 | 5.0 | 157 | 1.43 |
| 3 | 600 | 8374 | 2.2 | 70 | 0.64 |
| 4 | 600 | 8374 | 1.3 | 42 | 0.38 |
| 5 | 600 | 8374 | 2.6 | 80 | 0.73 |
| 6 | 600 | 8374 | 8.2 | 258 | 2.35 |
| 7 | 600 | 8374 | 16.2 | 510 | 4.64 |
| 8 | 600 | 8374 | 15.9 | 498 | 4.53 |
| 9 | 600 | 8374 | 13.9 | 436 | 3.97 |
| 10 | 600 | 8374 | 13.3 | 418 | 3.80 |
| 11 | 600 | 8374 | 15.8 | 496 | 4.51 |
| 12 | 600 | 8374 | 11.4 | 357 | 3.25 |
| 13 | 600 | 8374 | 12.6 | 395 | 3.59 |
| 14 | 600 | 8374 | 14.3 | 448 | 4.08 |
| 15 | 600 | 8374 | 13.3 | 418 | 3.80 |
| 16 | 600 | 8374 | 13.8 | 434 | 3.95 |
| 17 | 600 | 8374 | 14.8 | 465 | 4.23 |
| 18 | 600 | 8374 | 16.4 | 514 | 4.68 |
| 19 | 600 | 8374 | 18.8 | 589 | 5.36 |
| 20 | 600 | 8374 | 26.2 | 822 | 7.48 |
| 21 | 600 | 8374 | 30.0 | 942 | 8.57 |
| 22 | 600 | 8374 | 31.4 | 986 | 8.97 |
| 23 | 600 | 8374 | 27.1 | 850 | 7.73 |
| 24 | 600 | 8374 | 17.4 | 545 | 4.96 |

Tables 1 and 2 above show that the time period during which the amount of potential heat of the miscellaneous wastewater is relatively high is from 20:00 to 23:00, where the amount of potential heat obtained per hour is about 1000 kW. In this lodging facility, the heat source demand for covering the hot-water supply peak load by means of a heat pump hot-water supply system is about 5000 kW, as shown in Table 3. Therefore, based on Tables 1 to 3, the miscellaneous wastewater can cover at least about 20% of the heat source demand in this lodging facility.

Note that, in Table 3, the heat source demand is calculated by assuming hot-water outlet temperature=60° C., heat-source-water outlet temperature=25° C., and 100% load.

TABLE 3

| | HEAT PUMP HOT-WATER SUPPLY SYSTEM | | |
|---|---|---|---|
| PEAK LOAD kW | RATED COP | POWER CONSUMPTION kW | HEAT SOURCE DEMAND kW |
| 6,795 | 3.96 | 1,716 | 5,079 |

Table 4 below shows an example of temperature potential at this lodging facility. Table 4 shows that, during both summer and winter, the potential temperature of the miscellaneous wastewater in the lodging facility is higher than the potential temperature of the sewage, indicating that the miscellaneous wastewater would be particularly effective for heating purposes.

TABLE 4

| | SEWAGE | MISCELLANEOUS WASTEWATER |
|---|---|---|
| SUMMER | ABOUT 27° C. | ABOUT 32° C. |
| WINTER | ABOUT 17° C. | ABOUT 32° C. |

The above-described heat-source selecting device may be provided a scheduling portion for storing information in which at least one of the heat sources is associated with a preferential-use period thereof may be provided, the preferential-use period being a period in which the corresponding heat source is preferentially selected, wherein the judging portion may be configured to select the heat sources based on the information stored in the scheduling portion.

By registering the preferential-use period in advance for at least one of the heat sources in this way, the calculations of the potential temperatures and the amounts of potential heat for the individual heat sources can be eliminated during that preferential-use period.

With the above-described heat-source selecting device, an additional heat source may be used in combination when the temperature of the heating medium does not reach a target temperature set in advance during the preferential-use period.

By doing so, because the additional heat source is used in combination when the preferentially selected heat source alone cannot supply a sufficient amount of heat during the preferential-use period, it is possible to satisfy the heat source demand.

A second aspect of the present invention is a heat source system provided with the above-described heat-source selecting device.

The above-described heat source system may be provided with a plurality of heat source units which can cool or heat a first heating medium by using heat-source water supplied from the heat sources; a heating-medium pipe for circulating a second heating medium; a heat-source-water pipe for circulating the heat-source water from the heat sources; a heat transmitting pipe which is provided in a first heat exchanger for performing heat exchange between the heat-source water or the second heating medium and a circulating refrigerant in each of the heat source units, and configured to circulate the heat-source water or the second heating medium; a pipe switching device for selectively switching the pipe to be connected to the heat transmitting pipe between the heat-source-water pipe and the heating-medium pipe, in some of the heat source units among the plurality of heat source units; a circulation switching device for switching a flow of the circulating refrigerant in said some of the heat source units; and a connection-configuration controlling portion for switching between a connection configuration that includes a cascade connection and a connection configuration that does not include a cascade connection by controlling the pipe switching device and the circulation switching device.

By employing such a configuration, when the connection configuration that does not include the cascade connection is selected by means of the connection-configuration selecting portion, the heat transmitting pipes are connected to the heat-source-water pipes in all heat source units, heat exchange is consequently performed between the heat-source water and the circulating refrigerant at the first heat exchangers of the individual heat source units, and thus, the first heating medium is heated or cooled by using the circulating refrigerant that has undergone the heat exchange. In contrast, when the connection configuration that includes the cascade connection is selected, the heat transmitting pipes in some of the heat source units (hereafter, "the heat source units of the second heat-source-unit group") are connected to the heating-medium pipes, and, in addition, the flows of the circulating refrigerant in the heat source units of the second heat-source-unit group are switched. In such a connection configuration, heat exchange is performed between the heat-source water and the circulating refrigerant in the first heat exchangers of the heat source units other than the heat source units of the second heat-source-unit group, and thus, the first heating medium is heated or cooled by using the circulating refrigerant that has undergone the heat exchange. The first heating medium that has been heated or cooled is supplied to the heat source units of the second heat-source-unit group as heat-source water. By doing so, heat exchange is performed between the first heating medium and the circulating refrigerant in the heat source units of the second heat-source-unit group, thus heating or cooling the circulating refrigerant. Then, at the first heat exchangers, heat exchange is performed between this circulating refrigerant and the second heating medium that flows thereinto via the heating-medium pipes, and thus, the second heating medium is heated or cooled and supplied to other external loads.

In the above-described heat source system, the connection-configuration controlling portion may be provided with a computing portion for calculating a coefficient of performance of the heat source system for when the cascade connection is included and a coefficient of performance of the heat source system for when the cascade connection is not included; and a selecting portion for selecting the connection configuration for which the coefficient of performance calculated by the computing portion is the highest, the connection-configuration controlling portion controlling the pipe switching device and the circulation switching device in accordance with the connection configuration selected by means of the selecting portion.

As described above, because the coefficients of performance of the heat source system are calculated for the individual connection configurations, and the connection configuration having the highest coefficient of performance is selected, it is possible to judge whether or not a cascade connection can be employed based on the balance between the amount of heat possessed by the heat source and the target temperatures of the first heating medium and the second heating medium. By doing so, it is possible to select an appropriate connection configuration based on the amount of heat of the heat source.

In the above-described heat source system, when computing the coefficient of performance of the heat source system for when the cascade connection is included, the computing portion may calculate a coefficient of performance for a first heat-source-unit group formed of the heat source units in which the heat transmitting pipe conects to the heat-source-water pipe and a coefficient of performance for a second heat-source-unit group formed of the heat source units in which the heat transmitting pipe conects to the heating-medium pipe and may calculate the coefficient of performance of the heat source system by using the calculated coefficients of performance.

By employing such a configuration, the heat source units are divided into the first heat-source-unit group and the second heat-source-unit group, the coefficients of performance are separately calculated for the groups, and the coefficient of performance of the heat source system is calculated by using these coefficients of performance.

In the above-described heat source system, the coefficient of performance of the first heat-source-unit group may be computed by using predetermined computation formulas whose parameters include a heat-source-water outlet temperature, an outlet temperature of the first heating medium, and a heat-source-unit load factor, and the coefficient of performance of the second heat-source-unit group may be computed by using predetermined computation formulas whose parameters include a inlet temperature of the first heating medium, a outlet temperature of the second heating medium, and a heat-source-unit load factor.

In the above-described heat source system, the first heating medium produced in the first heat-source-unit group may be supplied to air-conditioning equipment for heating purposes, and the second heating medium produced in the first heat-source-unit group may be supplied to hot-water supplying equipment.

By doing so, the first heating medium is utilized in air-conditioning equipment for heating purposes, and the second heating medium is utilized in hot-water supplying equipment. Because the miscellaneous wastewater generated in the facility is a superior heat source for heating purposes, heat sources based on the miscellaneous wastewater can be utilized effectively.

A third aspect of the present invention is a heat-source selecting method, employed in a heat source system in which a plurality of heat sources can be utilized, for selecting a heat source to be used, wherein the plurality of heat sources include unused heat such as sewage, river water, groundwater, well water, sea water, lake water, and so forth, and wastewater generated in a facility in which an external load that receives a supply of heating medium heated or cooled by using the heat sources is installed, the heat-source selecting method including a potential determining step of determining potential temperatures that serve as evaluated values related to temperatures of the individual heat sources and amounts of potential heat that serve as evaluated values related to amounts of heat of the individual heat sources; and a judging step of identifying heat sources having the amounts of potential heat higher than a threshold set in advance, of selecting, from among the identified heat sources, the heat source having the highest potential temperature, in the case of heating purposes, and of selecting, from among the identified heat sources, the heat source having the lowest potential temperature, in the case of cooling purposes.

A fourth aspect of the present invention is an unused-heat utilization system including the above-described heat source system; and a central control device that collectively manages a usage state of the unused heat around a facility in which the heat source system is installed, wherein the central control device provides the heat source system with information about a potential temperature and an amount of potential heat of the unused heat for the facility.

Advantageous Effects of Invention

The present invention affords an advantage in that exhaust heat generated in a facility can be introduced as a heat source, and the heat sources can effectively be utilized.

DESCRIPTION OF EMBODIMENTS

First Embodiment

A heat source system according to a first embodiment of the present invention will be described below with reference to the drawings.

Figure 1:
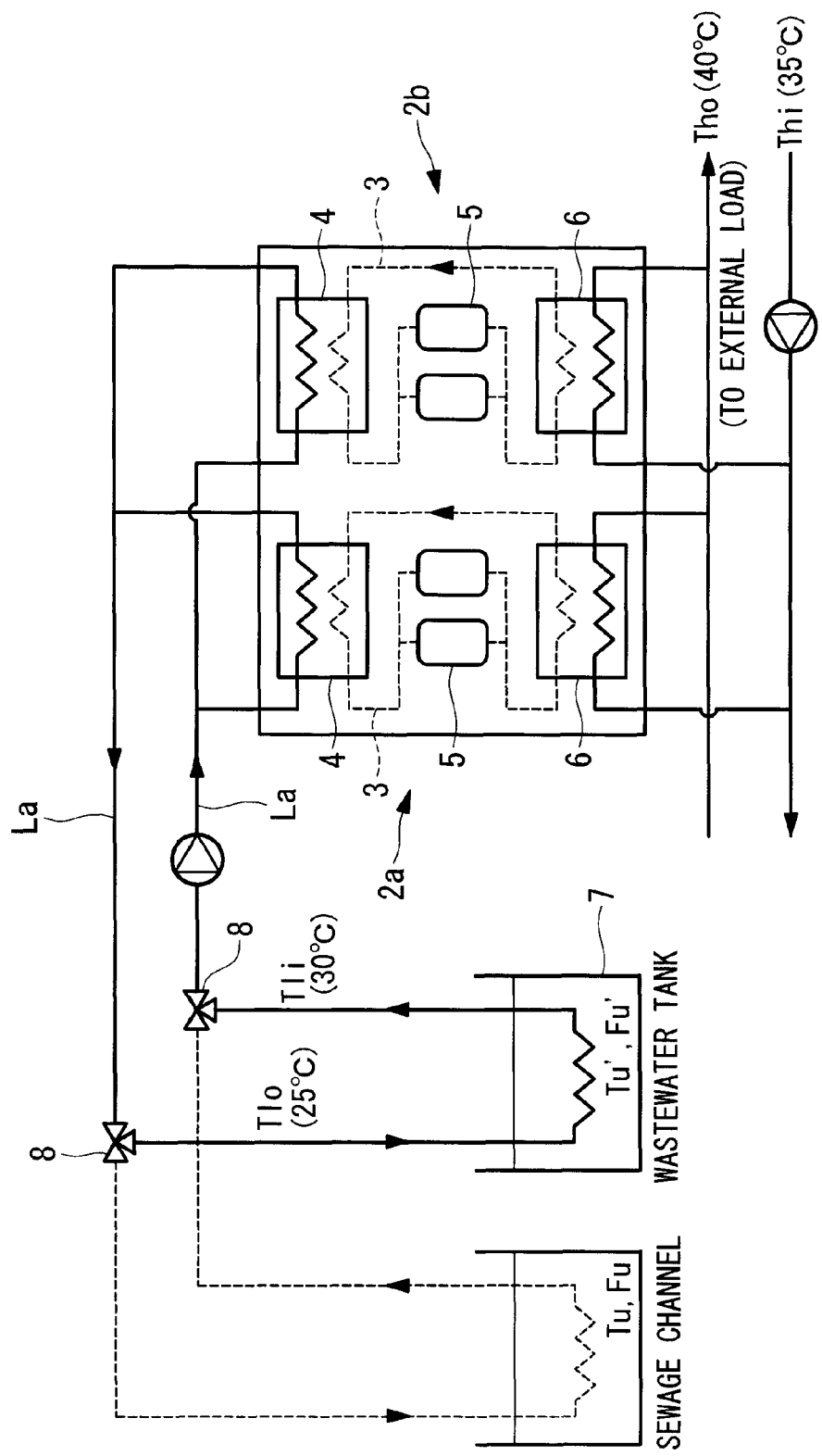
FIG. 1 is a diagram showing, in outline, the configuration of a heat source system according to a first embodiment of the present invention.

FIG. 1 is a diagram showing, in outline, the configuration of the heat source system according to the first embodiment of the present invention. A heat source system 1 according to this embodiment is a heat source system utilized for so-called heating purposes, in which a heating medium whose temperature has dropped after being utilized at an external load is heated to a predetermined temperature and supplied to the external load.

The heat source system 1 is provided with a plurality of heat source units 2a and 2b. Although FIG. 1 shows a case in which two heat source units are provided, there is no limitation on the number of the heat source units.

The heat source units 2a and 2b include refrigerant circuits 3 in which refrigerant is circulated, respectively. The refrigerant circuit 3 is provided with a first heat exchanger 4 that performs heat exchange between the refrigerant and heat-source water supplied from a heat source, a compressor 5 that compresses the refrigerant, and a second heat exchanger 6 that performs heat exchange between the refrigerant and a heating medium that flows thereinto from the external load.

With such heat source units 2a and 2b, the refrigerant is heated by means of heat exchange performed at the first heat exchangers 4 between the refrigerant and the heat-source water supplied from the heat source, described later, and is made to flow to the compressors 5. By being compressed at the compressors 5, the refrigerant is turned into a high-temperature, high-pressure gaseous form and is made to flow to the second heat exchangers 6. At the second heat exchangers 6, heat exchange is performed between the high-temperature, high-pressure refrigerant and the heating medium that flows thereinto from the external load, thus heating the heating medium to a predetermined target temperature. The heated heating medium is made to flow to the external load (not shown) and is utilized therein. On the other hand, the refrigerant that has been cooled by means of heat exchange with the heating medium at the second heat exchangers 6 is made to flow to the first heat exchangers 4, where heat exchange is performed again between the refrigerant and the heat-source water.

As described above, in this embodiment, the first heat exchangers 4 serve as evaporators, and the second heat exchangers 6 serve as condensers.

The target temperature of the heating medium is set in accordance with the usage of the external load. For example, if the external load is circulating-type hot-water supplying equipment, the target temperature will be set at about 60° C. In addition, if the external load is air-conditioning equipment that performs a heating operation, the target temperature will be set at about 40° C., and the heating medium that has been utilized in the air-conditioning equipment and cooled to about 35° C. is returned to the heat source units 2a and 2b. FIG. 1 shows reference temperatures in parentheses for an example case in which the external load is assumed to be air-conditioning equipment that performs a heating operation.

The heat source system 1 is configured so that a plurality of heat sources can be utilized. In this embodiment, an extra-facility heat source and an intra-facility heat source are provided as the heat sources, and it is possible to switch between them or to use them in combination.

The extra-facility heat source is unused heat of, for example, sewage, river water, groundwater, well water, sea water, lake water, and so forth, and FIG. 1 shows an example in which sewage is utilized. The intra-facility heat source is, for example, wastewater generated in a facility in which an external load supplied with the heating medium heated by the heat source system 1 is installed, and it is stored in a wastewater tank 7. For example, when the external load is assumed to be hot-water supplying equipment of a lodging facility, wastewater due to water use in this lodging facility (for example, miscellaneous wastewater or the like from guest rooms, a swimming pool, laundry, a parking lot, a machine room, and so forth) is stored in the wastewater tank 7 and is used as the intra-facility heat source.

In the heat source system 1, heat-source-water pipes La for circulating the heat-source water to the first heat exchangers 4 are provided with heat-source switching valves 8 for switching the destinations to which the heat source is supplied. By controlling the heat-source switching valves 8 by means of a system control device 10 (see FIG. 2), described later, the heat-source water that has taken in heat from one of the extra-facility heat source and the intra-facility heat source, or from both heat sources, is made to flow to the first heat exchangers 4 of the heat source units 2a and 2b. Note that, in FIG. 1, the heat-source water that has undergone heat exchange at the extra-facility heat source or the intra-facility heat source is supplied to the first heat exchangers 4; however, if the contamination level allows, the heat source itself (for example, the unused heat or the miscellaneous wastewater) may be supplied to the first heat exchangers 4 as heat-source water.

The heat source system 1 is provided with sensors (not shown) for measuring an extra-facility heat source temperature Tu, an extra-facility heat source flow rate Fu, an intra-facility heat source temperature Tu', and an intra-facility heat source flow rate Fu'. Measured values from these sensors are transmitted to the system control device 10 (see FIG. 2) and are utilized in making decisions on heat-source selection.

The system control device 10 is, for example, a computer, and is provided with a CPU (Central Processing Unit), a main storage device, such as a RAM (Random Access Memory), an auxiliary storage deice, a communication device that sends and receives information by communicating with external equipment, and so on.

The auxiliary storage device is a computer-readable storage medium; for example, it is a magnetic disk, a magneto-optical disk, a CD-ROM, a DVD-ROM, a semiconductor memory, or the like. Various programs are stored in this auxiliary storage device, and the CPU reads out these programs into the main storage device from the auxiliary storage device and executes them, thus realizing various processing.

Figure 2:
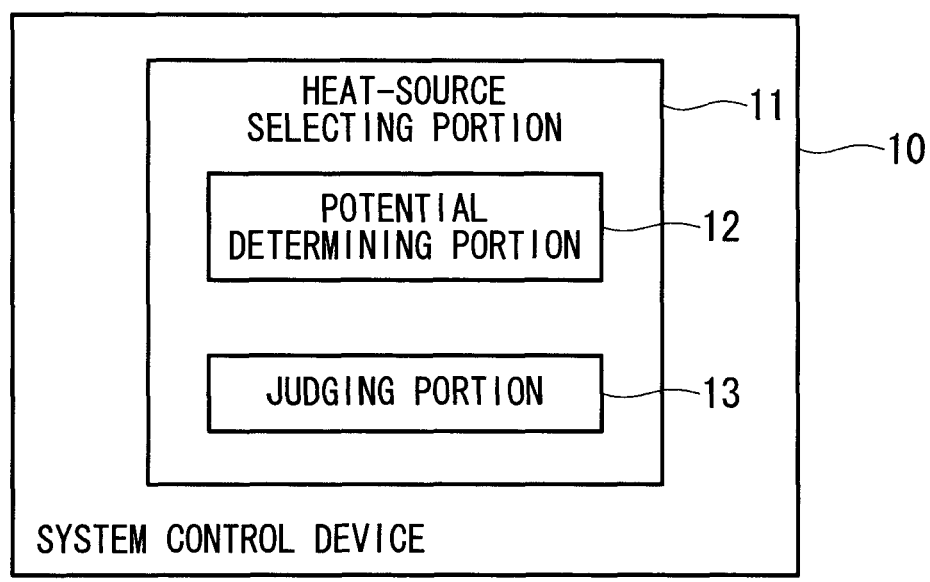
FIG. 2 is a functional block diagram showing, of various functions provided in a system control device according to the first embodiment of the present invention, main elements related to a heat-source selecting function.

FIG. 2 is a functional block diagram showing, of various functions provided in the system control device 10, main elements related to a heat-source selecting function.

As shown in FIG. 2, the system control device 10 is provided with a heat-source selecting portion 11 having a potential determining portion 12 and a judging portion 13 as main components thereof.

The potential determining portion 12 determines amounts of potential heat (kW), which serve as evaluated values related to the amounts of heat of the individual heat sources, and potential temperatures (° C.), which serve as evaluated values related to the temperatures of the individual heat sources.

A amount of potential heat Qu of the extra-facility heat source and a amount of potential heat Qu' of the intra-facility heat source are calculated by using the following Expression (1) and Expression (2), respectively.

$$Qu=(Tu-Ts)\times C\times\gamma\times Fu \quad (1)$$

$$Qu'=(Tu'-Ts)\times C\times\gamma\times Fu' \quad (2)$$

In Expression (1) and Expression (2), Tu is the extra-facility heat source temperature (° C.), Ts is a reference temperature (° C.) which is arbitrarily defined, Fu is the extra-facility heat source flow rate (m³/hr), Tu' is the intra-facility heat source temperature (° C.), and Fu' is the intra-facility heat source flow rate (m³/hr), for which measured values from the individual sensors (not shown) are used. C is the specific heat (kJ/kg·K), and γ is the relative density (kg/m³).

The extra-facility heat source temperature Tu (° C.) and the intra-facility heat source temperature Tu' (° C.) measured by the sensors are directly used as the potential temperatures (° C.).

The judging portion 13 determines a heat source to be used based on the potential temperatures and the amounts of potential heat of the individual heat sources determined by the potential determining portion 12.

For example, the judging portion 13 identifies heat sources having higher amounts of potential heat than a threshold Qmin set in advance, and, from among the identified heat sources, selects a heat source having the highest potential temperature as the heat source to be used. Here, the threshold Qmin may be determined based on the minimum necessary amount of potential heat. The threshold Qmin may be empirically determined fixed value or a value calculated from time to time based on heat demand.

Figure 3:
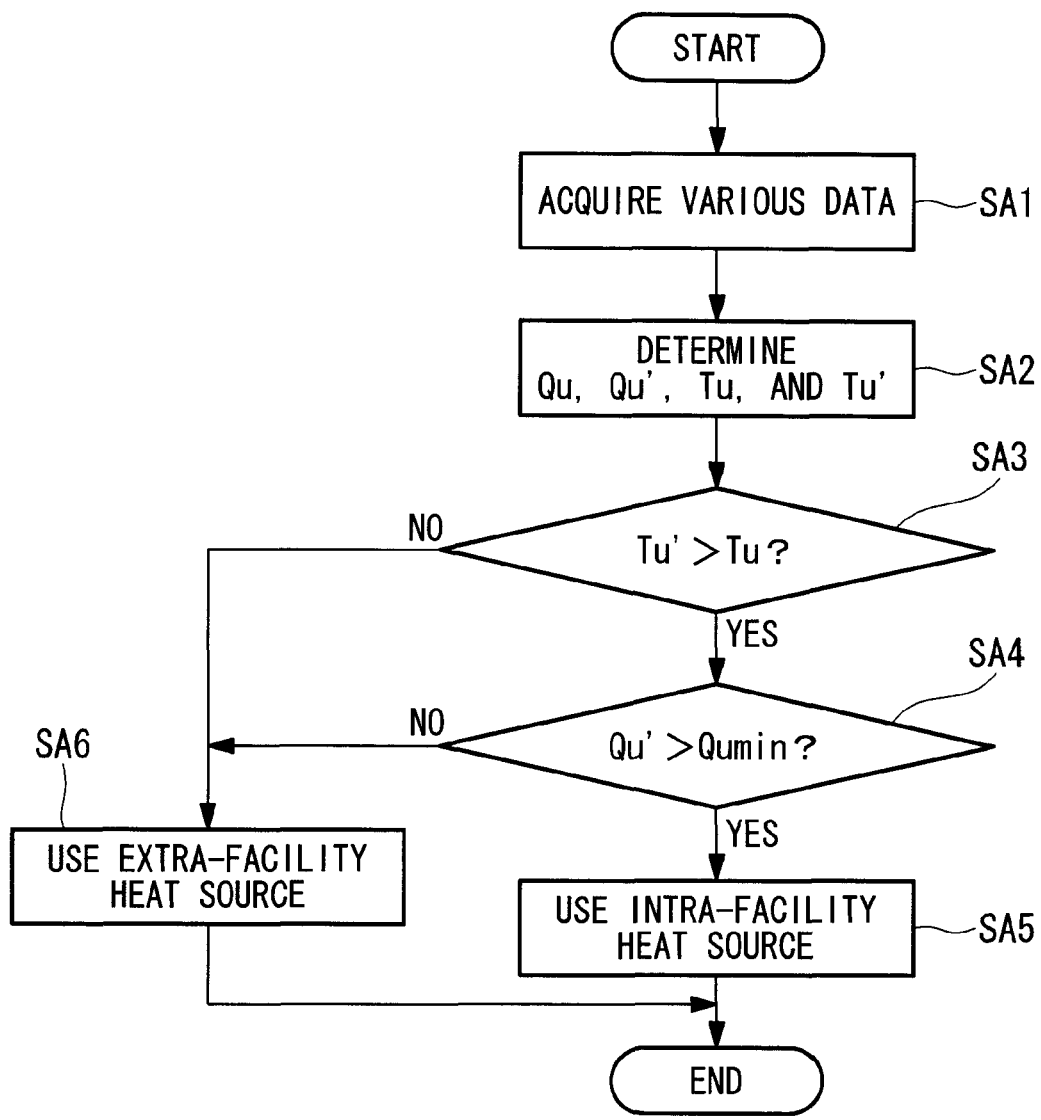
FIG. 3 is a flowchart showing the processing procedure executed by a heat-source selecting portion when heating is performed by the heat source system.

FIG. 3 is a diagram showing a specific example of the processing procedure executed by the heat-source selecting portion 11 described above.

First, the heat-source selecting portion 11 receives inputs of the extra-facility heat source temperature Tu (° C.), the extra-facility heat source flow rate Fu (m³/hr), the intra-facility heat source temperature Tu' (° C.), and the intra-facility heat source flow rate Fu' (m³/hr) from the sensors (not shown) (Step SA1).

The potential determining portion 12 of the heat-source selecting portion 11 determines the amount of potential heat Qu and the potential temperature Tu of the extra-facility heat source and the amount of potential heat Qu' and the potential temperature Tu' of the intra-facility heat source based on the input sensor measurement values and the Expressions (1) and (2) described above, and outputs them to the judging portion 13 (Step SA2).

The judging portion 13 judges whether or not the potential temperature Tu' of the intra-facility heat source is higher than the potential temperature Tu of the extra-facility heat source (Step SA3). As a result, if the potential temperature Tu' of the intra-facility heat source is higher ("YES" in Step SA3), the judging portion 13 subsequently judges whether or not the amount of potential heat Qu' of the intra-facility heat source is higher than the threshold Qmin set in advance (Step SA4). As a result, if the amount of potential heat Qu' of the intra-facility heat source is higher than the threshold Qmin, the intra-facility heat source is selected as the heat source to be used (Step SA5).

On the other hand, when the potential temperature Tu' of the intra-facility heat source is equal to or less than the potential temperature Tu of the extra-facility heat source ("NO" in Step SA3) or when the amount of potential heat Qu' of the intra-facility heat source is equal to or less than the threshold Qmin ("NO" in Step SA4), the judging portion 13 selects the extra-facility heat source as the heat source to be used (Step SA6).

Once the heat source to be used is selected in this way, the heat-source selecting portion 11 of the system control device 10 controls the heat-source switching valves 8 so that the selected heat source is utilized as the heat source for the heat source units 2a and 2b.

The heat-source selecting portion 11 of the system control device 10 executes the above-described processing at a preset time of the day or at predetermined time intervals, thus making it possible to select, from time to time, a suitable heat source as the heat source to be used.

As has been described above, with the heat source system 1 according to this embodiment, because the plurality of heat sources can be utilized, and because a heat source having the highest potential for supplying heat is selected as the heat source to be used based on the amounts of potential heat and the potential temperatures of the individual heat sources, amounts of heat possessed by the heat sources can be utilized effectively.

When the heat source selected as the heat source to be used is being utilized, if the temperature of the heating medium cannot be made to match a target temperature due to a lack of amounts of heat in the heat source, an additional heat source may be used in combination. In this case, the temperature of the heating medium to be supplied to the external load (Tho in FIG. 1) is monitored, and, when this temperature does not reach the target temperature, the heat-source selecting portion 11 of the system control device 10 controls the heat-source switching valves 8 so that the additional heat source is used in combination. By doing so, the heat-source water that has taken in heat from the intra-facility heat source and the extra-facility heat source is supplied to the first heat exchangers 4 of the heat source units 2a and 2b, making it possible to eliminate the lack of amounts of heat.

Although this embodiment has been described in terms of an example in which the heating medium is heated at the heat source units 2a and 2b, the heat-source selecting device and the method thereof according to the present invention can also be employed in a heat source system in which the heating medium is cooled at the heat source units 2a and 2b.

Figure 4:
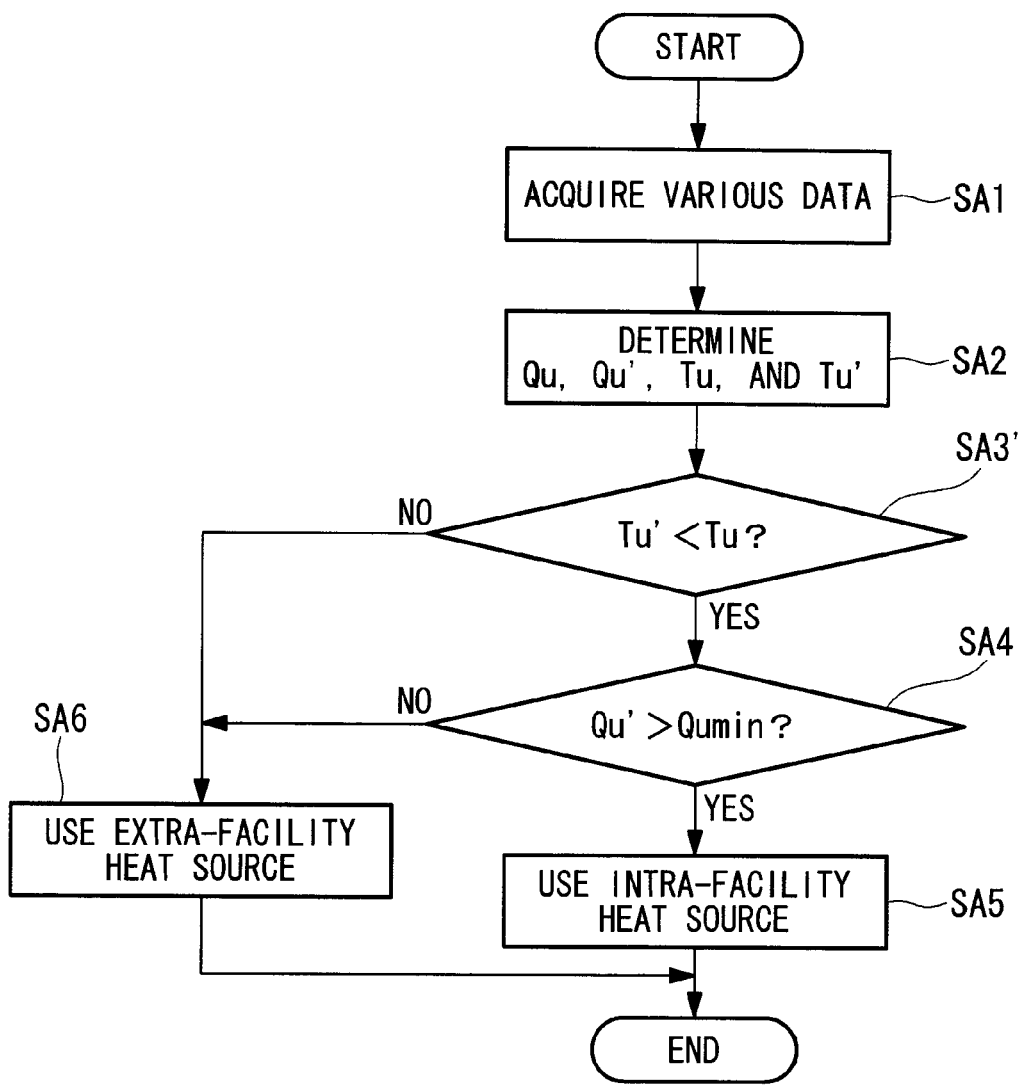
FIG. 4 is a flowchart showing the processing procedure executed by the heat-source selecting portion when cooling is performed by the heat source system.

In this case, the heat-source selecting portion 11 of the system control device 10 selects, from among the heat sources having higher amounts of potential heat than the threshold Qmin, a heat source having the lowest potential temperature as the heat source to be used. FIG. 4 shows the processing procedure for this case. As shown in FIG. 4, in the case in which the heating medium is cooled, a heat source having a lower potential temperature is selected (Step SA3').

Second Embodiment

Next, a heat source system according to a second embodiment of the present invention will be described with reference to the drawings. The heat source system according to this embodiment differs from the heat source system according to the first embodiment described above in that changes in the amount of potential heat of the intra-facility heat source over the course of one day are analyzed in advance, a time period during which the intra-facility heat source will be preferentially utilized is determined based on these changes, and this preferential-use period is registered in advance.

In the following, differences from the heat source system according to the first embodiment described above will mainly be described.

Figure 5:
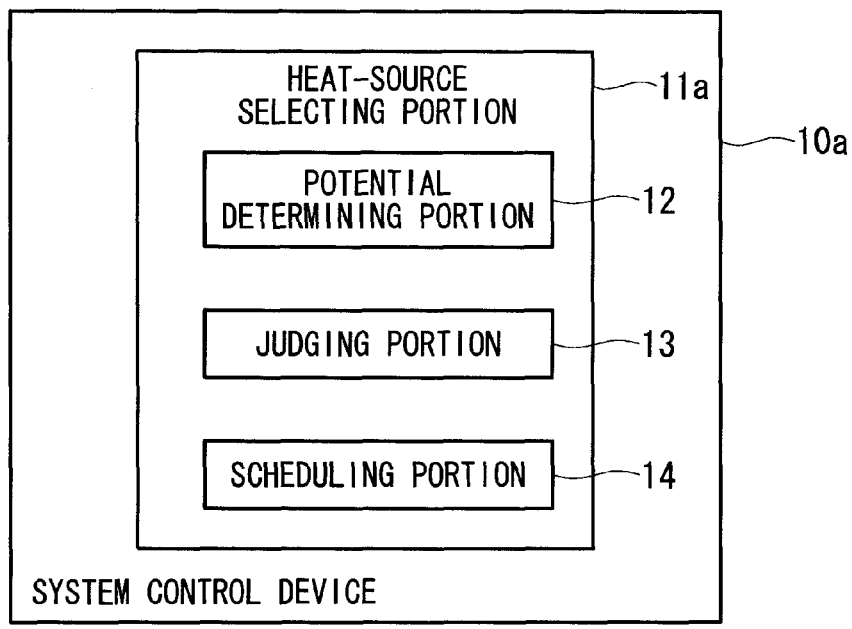
FIG. 5 is diagram showing a functional block diagram of a heat-source selecting portion provided in a system control device according to a second embodiment of the present invention.

FIG. 5 is a functional block diagram of a system control device 10a according to this embodiment. As shown in FIG. 5, in this embodiment, a scheduling portion 14 is added to the configuration of a heat-source selecting portion 11a.

At least for one heat source, a preferential-use period during which that heat source is preferentially utilized is registered in the scheduling portion 14.

Figure 6:
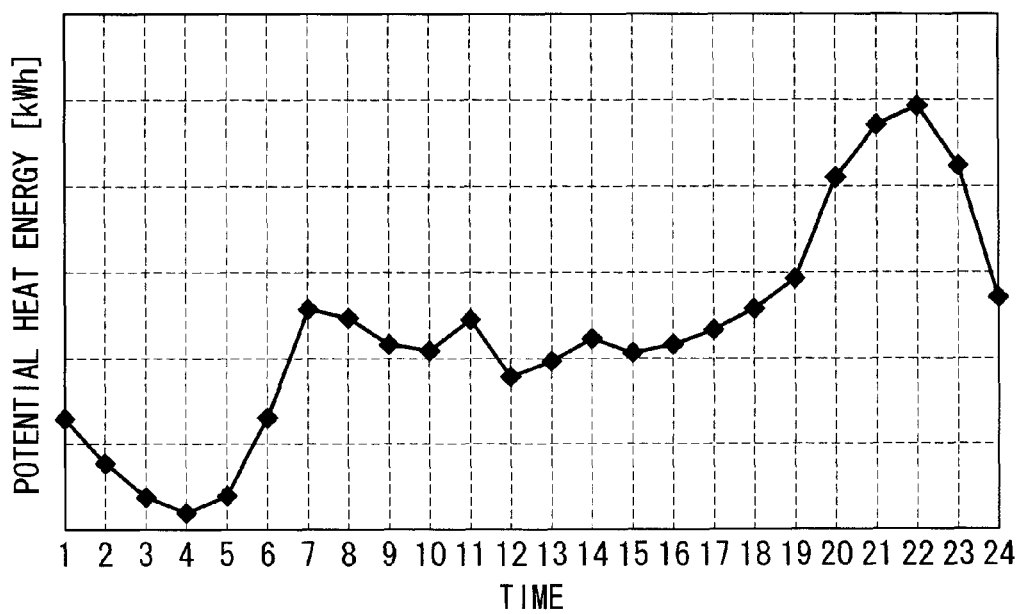
FIG. 6 is a diagram showing an example of the change over time of amount of potential heat of an intra-facility heat source.

FIG. 6 shows an example of the change over time in the amount of potential heat of the intra-facility heat source. In the graph shown in FIG. 6, it is clear that the amount of potential heat is relatively high from 19:00 to 24:00. Therefore, for example, the time period from 19:00 to 24:00 is registered in the scheduling portion 14 as the preferential-use period for the intra-facility heat source. The preferential-use period can be appropriately selected and set by a system designer or the like based on the analysis result of the change over time in the amount of potential heat. As one indicator, the threshold Qmin used in the first embodiment may be used as a reference, and, in FIG. 6, a period during which the amount of potential heat is equal to or higher than the threshold Qmin may be determined to be the preferential-use period.

In the thus-configured system control device 10a, the scheduling portion 14 judges whether or not there is a heat source for which the current time falls in its preferential-use period, and, if there is a heat source for which the current time falls in its preferential-use period, the scheduling portion 14 issues information about the heat source in the preferential-use period to the judging portion 13.

Upon receiving the information about the heat source in the preferential-use period from the scheduling portion 14, the judging portion 13 selects this heat source as the heat source to be used.

When the preferential-use period of the heat source, for which the information thereof has been issued to the judging portion 13, ends, the scheduling portion 14 issues information indicating the ending of the preferential-use period. Accordingly, the judging portion 13 cancels the preferential use of the heat source notified by the scheduling portion 14 and restarts the selection of the heat source to be used based on the potential temperatures and the amounts of potential heat, as in the first embodiment described above.

By doing so, for example, when the period from 19:00 to 24:00 is registered in the scheduling portion 14 as the preferential-use period of the intra-facility heat source, the intra-facility heat source is selected by the judging portion 13 as the heat source to be used during this period and is used as the heat source for the heat source units 2a and 2b.

As has been described above, with the heat source system according to this embodiment, because the preferential-use period is registered in the scheduling portion 14 for at least one heat source, during this preferential-use period, the registered heat source can be automatically selected. By doing so, the processing performed by the system control device 10a can be reduced. During the preferential-use period, if the temperature of the heating medium cannot be increased to the target temperature, it is also possible to eliminate an amount of heat shortage by using an additional heat source (for example, the extra-facility heat source) in combination.

As another embodiment, it is conceivable to mainly use the extra-facility heat source and to use the intra-facility heat source in combination therewith when the extra-facility heat source alone cannot supply sufficient amount of heat. In this case, the preferential-use period of the extra-facility heat source should be set to a 24-hour period. By doing so, first, the extra-facility heat source is selected as the heat source to be used and, if the temperature of the heating medium cannot be increased to the target temperature, the intra-facility heat source will be used in combination therewith. In the case in which a plurality of heat sources exist, not only preferential-use periods therefor, but also priority ranks thereof may be made settable. By doing so, it becomes possible also to specify the order in which the heat sources are preferentially selected.

Third Embodiment

Next, a heat source system according to a third embodiment of the present invention will be described with reference to the drawings.

The heat source system according to this embodiment differs from the heat source system according to the first embodiment described above in that it is possible to employ different connection configurations for the heat source unit 2a and a heat source unit 2b'.

In the following, the same reference signs are assigned to the same components as those of the first embodiment described above, omitting descriptions thereof; and differences in the heat source system 1b according to this embodiment will mainly be described.

Figure 7:
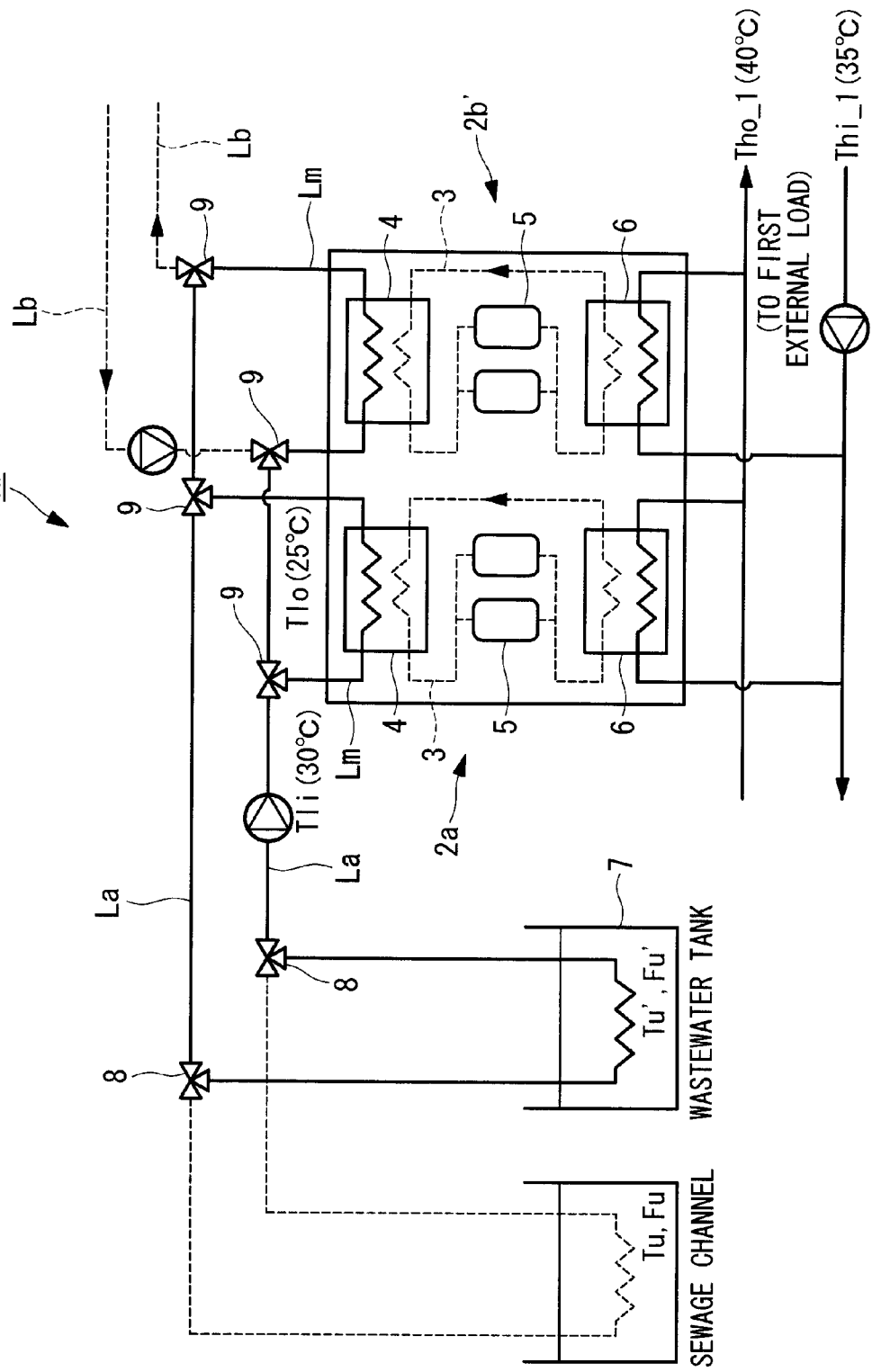
FIG. 7 is a diagram showing, in outline, the configuration of a heat source system according to a third embodiment of the present invention, in which the connection configuration thereof does not include a cascade connection.
Figure 8:
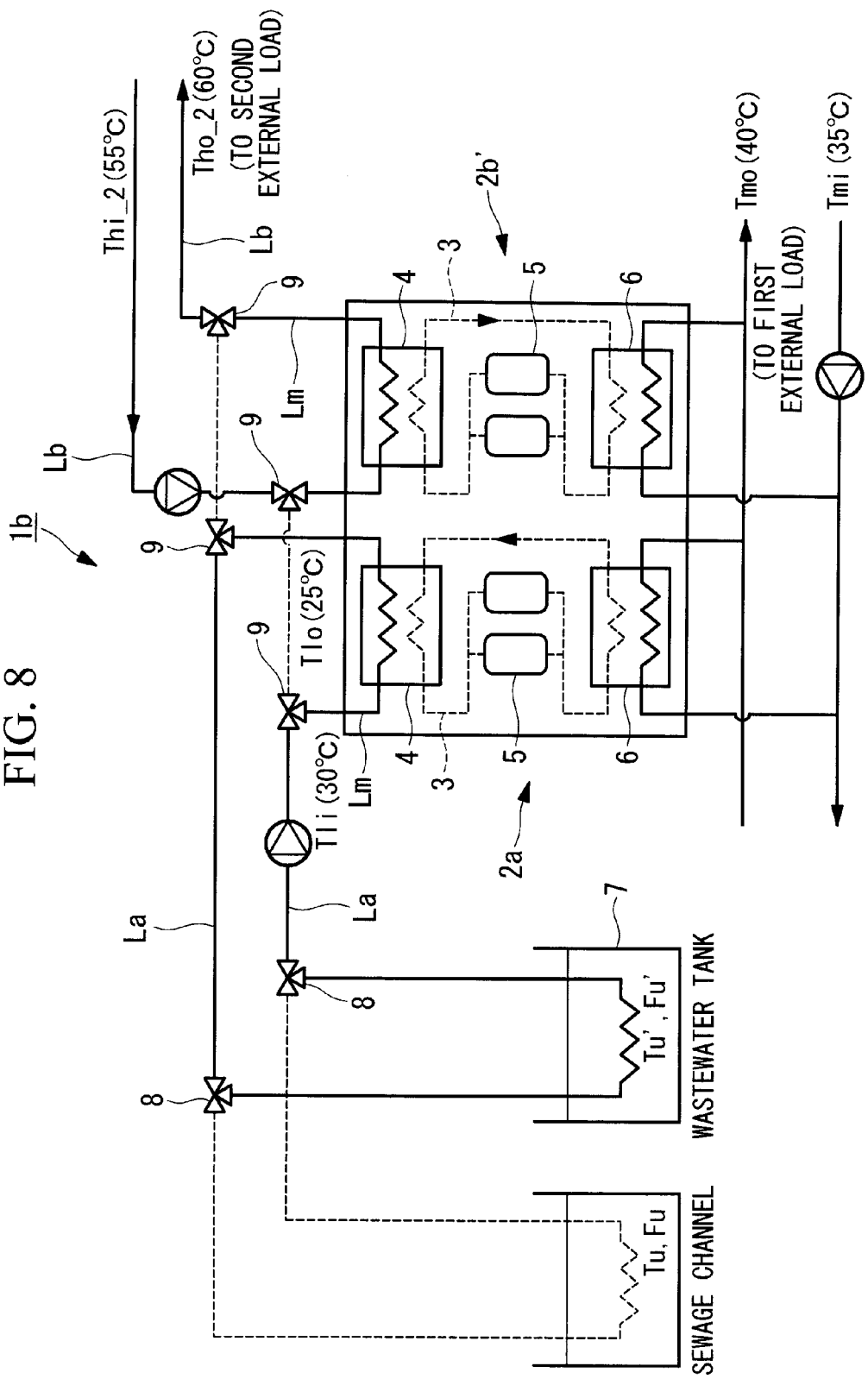
FIG. 8 is a diagram showing, in outline, the configuration of the heat source system according to the third embodiment of the present invention, in which the connection configuration thereof includes the cascade connection.

FIGS. 7 and 8 are diagrams showing, in outline, the configuration of the heat source system 1b according to this embodiment; FIG. 7 shows an example pipe connection in which the connection configuration thereof does not include a cascade connection; and FIG. 8 shows an example pipe connection in which the connection configuration thereof includes a cascade connection.

As shown in FIGS. 7 and 8, the heat source system 1b according to this embodiment is provided with a pipe switching valve (pipe switching device) 9 that, in the first heat exchanger 4 of the heat source unit 2b', switches the pipe to be connected to a heat transmitting pipe Lm, in which a medium to be subjected to heat exchange with the circulating refrigerant is circulated, between the heat-source-water pipe La that circulates the heat-source water, and a heating-medium pipe Lb that circulates a second heating medium.

Furthermore, in the heat source unit 2b', the refrigerant circuit 3 in which the circulating refrigerant is circulated is provided with a four-way valve (circulation switching device) for switching the circulation direction of the circulating refrigerant, which is not illustrated. Then, as shown in FIG. 7, when the heat transmitting pipe Lm is connected to the heat-source-water pipe La in the first heat exchanger 4 of the heat source unit 2b', the four-way valve is set so that, in the heat source unit 2b', the circulating refrigerant flows through the compressor 5, the second heat exchanger 6, and the first heat exchanger 4 so as to be returned to the compressor 5 again. In this case, the refrigerant system is configured in the same way as in the case of the first embodiment shown in FIG. 1, and the heating medium (hereinafter, referred to as "first heating medium") is heated by means of the heat source units 2a and 2b' and is supplied to the external load (hereinafter, referred to as "first external load").

On the other hand, as shown in FIG. 8, when the heat transmitting pipe Lm of the heat source unit 2b' is connected to the heating-medium pipe Lb, the four-way valve is set so that, in the heat source unit 2b', the circulating refrigerant flows through the compressor 5, the first heat exchanger 4, and the second heat exchanger 6 so as to be returned to the compressor 5 again. In this case, the first heat exchanger 4 serves as a condenser and the second heat exchanger 6 serves as an evaporator.

Specifically, in a connection configuration like the one shown in FIG. 8, the circulating refrigerant heated at the first heat exchanger 4 of the heat source unit 2a is made to flow to the second heat exchanger 6 via the compressor 5. At the second heat exchanger 6, the high-temperature, high-pressure circulating refrigerant undergoes heat exchange with the first heating medium, thus heating the first heating medium.

The first heating medium heated at the heat source unit 2a is utilized as a heat source for the heat source unit 2b' and is also made to flow to the first external load (for example, air-conditioning equipment installed in the facility), thus being utilized as a heat source for heating.

At the second heat exchanger 6 of the heat source unit 2b', heat exchange is performed between the first heating medium heated at the heat source unit 2a and the circulating refrigerant, thus heating the circulating refrigerant. The circulating refrigerant heated by means of the heat exchange with the first heating medium is turned into high-temperature, high-pressure gaseous refrigerant by means of the compressor 5 and is made to flow to the first heat exchanger 4. At the first heat exchanger 4, the second heating medium supplied from the heating-medium pipe Lb is circulated through the heat transmitting pipe Lm, by which heat exchange is performed between the second heating medium and the high-temperature, high-pressure gaseous circulating refrigerant, thus heating the second heating medium. The heated second heating medium is circulated through the heating-medium pipe Lb and is supplied to a second external load (for example, hot-water supplying equipment provided in the facility) to be utilized therein.

In this way, with the connection configuration shown in FIG. 8, the first heating medium heated at the heat source unit 2a is utilized as a heat source at the heat source unit 2b'. By cascade connecting the plurality of heat source units 2a and 2b' in this way, it is possible to generate a heating medium having an even higher temperature at the higher-temperature (downstream stage) heat source unit $2b'$.

By setting the temperature of the heating medium at a cascade connected portion, in other words, a temperature Tmo of the first heating medium utilized as a heat source at the high-temperature heat source unit $2b'$, to a temperature required in the facility (for example, an appropriate temperature for the heating operation of air-conditioning equipment), the first heating medium can also be utilized effectively in the facility.

Figure 9:
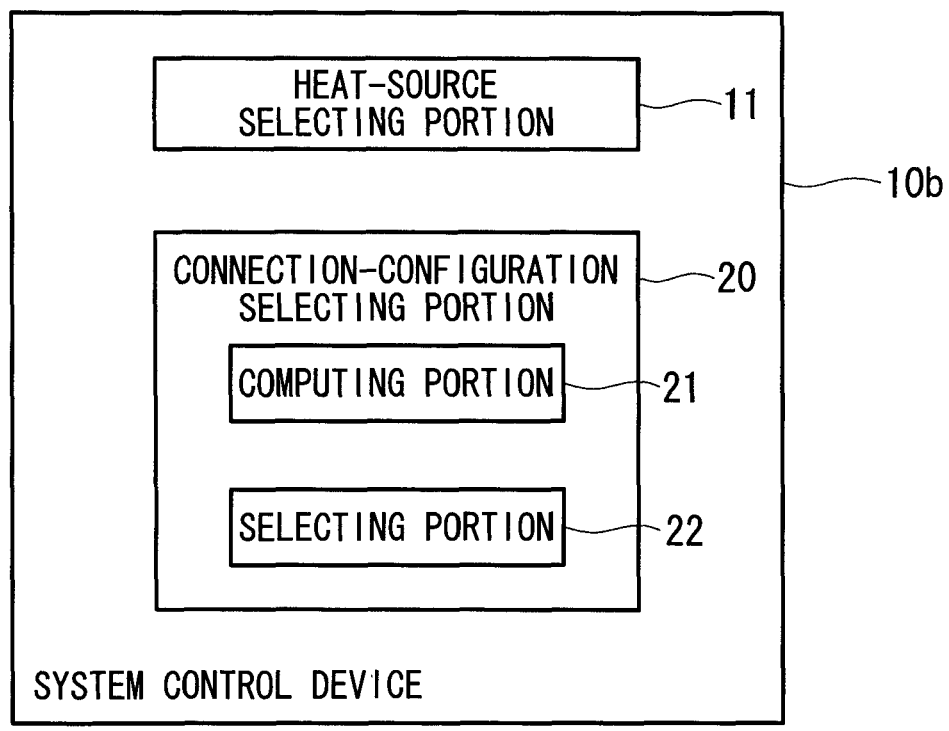
FIG. 9 is a diagram showing a functional block diagram of a system control device according to the third embodiment of the present invention.

A system control device $10b$ (see FIG. 9) executes switching control of the pipe switching valves 9 and switching control of the four-way valve (not shown) in the heat source system $1b$ described above. FIG. 9 shows a functional block diagram of the system control device $10b$ according to this embodiment. The system control device $10b$ is provided with the heat-source selecting portion 11 and a connection-configuration selecting portion 20.

The heat-source selecting portion 11 is similar to that described in the first embodiment. Note that, instead of the heat-source selecting portion 11, the heat-source selecting portion $11a$ according to the second embodiment may be provided.

The connection-configuration selecting portion 20 is provided with, as main components, a computing portion 21 that calculates a coefficient of performance COP for when the cascade connection is not included (see FIG. 7); and a coefficient of performance COPc for when the cascade connection is included (see FIG. 8) and a selecting portion 22 that determines the connection configuration based on the coefficients of performance COP and COPc calculated at the computing portion 21.

Figure 10:
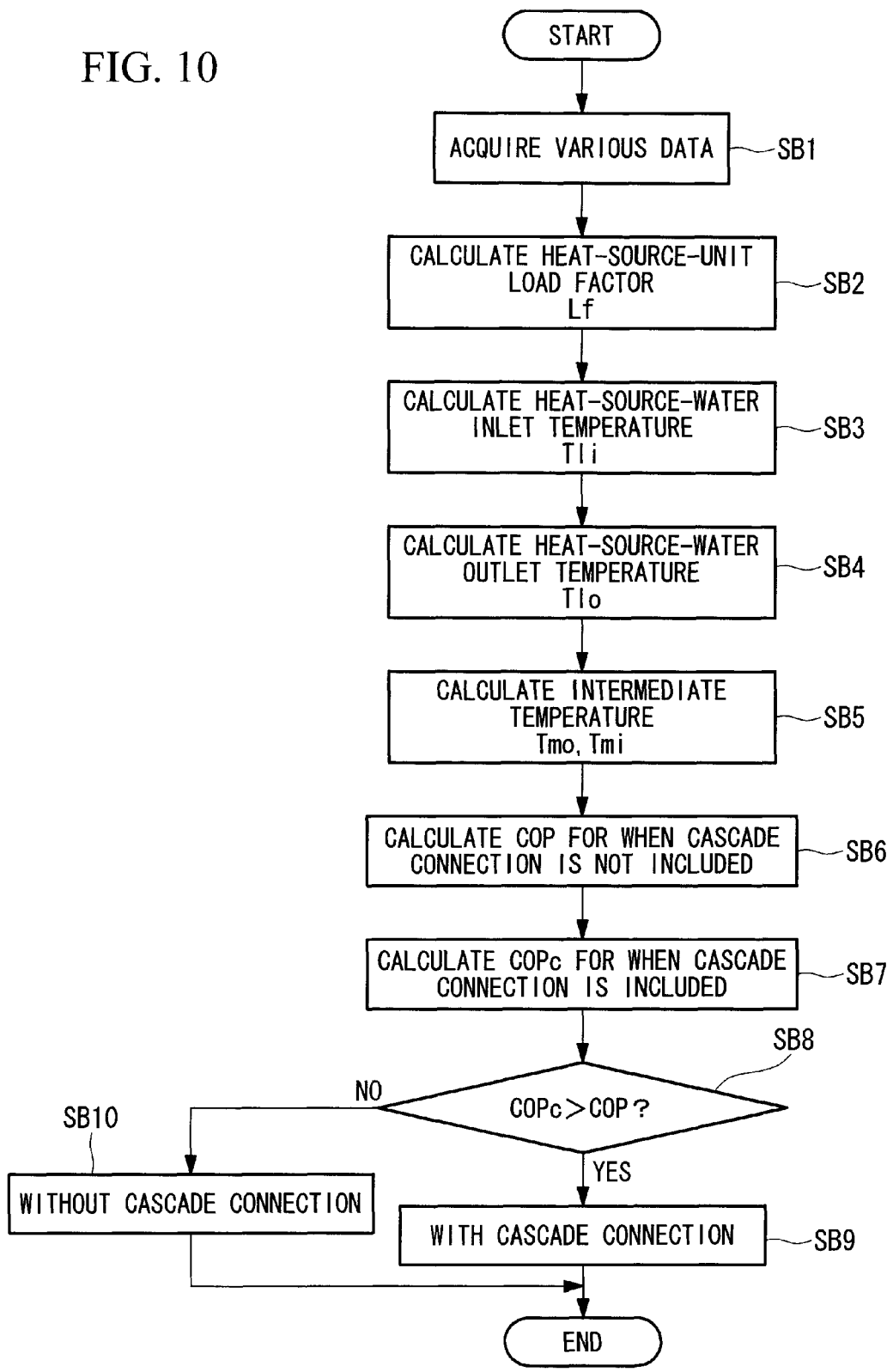
FIG. 10 is a flowchart showing the processing procedure executed by a connection-configuration selecting portion shown in FIG. 9.

The computing portion 21 calculates the coefficient of performance COP for when the cascade connection is not included and the coefficient of performance COPc for when the cascade connection is included by, for example, executing processing from Steps SB1 to SB7 shown in FIG. 10. Individual computation processing will be described below with reference to FIG. 10.

First, in Step SB1, various required data for calculating the coefficients of performance are acquired. Examples of data to be acquired include a heating capacity Q, a rated heating capacity Qr, a temperature Tu_sel of a heat source selected by the heat-source selecting portion 11, and so forth. With regard to the heat-source temperature Tu_sel, when the extra-facility heat source is selected by the heat-source selecting portion 11, Tu_sel=Tu, and when the intra-facility heat source is selected, Tu_sel=Tu'.

In Step SB2, a heat-source-unit load factor Lf is calculated by using Expression (3) below.

$$Lf = Q/Qr \qquad (3)$$

In Step SB3, a heat-source-water inlet temperature Tli is calculated by using Expression (4).

$$Tli = Tu\_sel - \Delta Tu\_sel \qquad (4)$$

In Expression (4), $\Delta Tu\_sel$ is a constant determined by the capacity of a heat exchanger (not shown) that performs heat exchange between the heat source (sewage or wastewater) selected by the heat-source selecting portion 11 and the heat-source water. Note that, in the case in which the heat-source-water inlet temperature is measured by a temperature sensor (not shown), such as when the heat source system $1b$ is in operation, a measured value from that sensor may be used.

In Step SB4, a heat-source-water outlet temperature Tlo is calculated by using Expression (5). The heat-source-water outlet temperature Tlo is the temperature of the heat-source water that has undergone heat exchange with the circulating refrigerant at the first heat exchanger 4.

$$Tlo = Tli - \Delta Tl \times Lf \qquad (5)$$

In Expression (5), Tli is the heat-source-water inlet temperature calculated in Step SB3, $\Delta Tl$ is a constant determined by the capacity of the first heat exchanger 4, and Lf is the heat-source-unit load factor calculated in Step SB2. Note that, in the case in which the heat-source-water outlet temperature is measured by a sensor (not shown), such as when the heat source system $1b$ is in operation, a measured value from that sensor may be used.

In Step SB5, intermediate temperatures are calculated. As shown in FIG. 8, the intermediate temperatures are a first-heating-medium inlet temperature Tmi and a first-heating-medium outlet temperature Tmo, which serve as parameters used for calculating the coefficient of performance COPc for when the cascade connection is included.

The first-heating-medium outlet temperature Tmo is calculated by using Expression (6), and the first-heating-medium inlet temperature Tmi is calculated by using Expression (7).

$$Tmo = (Tho\_2 + Tlo)/2 \qquad (6)$$

$$Tmi = Tmo - \Delta Tm \times Lf \qquad (7)$$

In Expression (6), Tho_2 is the outlet temperature of the second heating medium and Tlo is the heat-source-water outlet temperature calculated in Step SB4.

In Expression (7), Tmo is the inlet temperature of the first heating medium calculated by using Expression (6), $\Delta Tm$ is a constant determined by the capacity of the second heat exchanger 6, and Lf is the heat-source-unit load factor calculated in Step SB2.

In Step SB6, the coefficient of performance COP for when the cascade connection is not included is calculated by using Expression (8).

$$COP = f(Tlo, Tho\_1, Lf) \qquad (8)$$

In Expression (8), Tlo is the heat-source-water outlet temperature calculated in Step SB4, Tho_1 is the outlet temperature of the first heating medium, as shown in FIG. 7, and Lf is the heat-source-unit load factor calculated in Step SB2. The coefficient of performance COP can be determined by using a predetermined function whose parameters include the heat-source-water outlet temperature, the outlet temperature of the first heating medium, and the heat-source-unit load factor, as in Expression (8) described above.

In Step SB7, the coefficient of performance COPc for when the cascade connection is included is calculated by using Expression (9).

$$COPc = COPcl \times COPch/(COPcl + COPch) \qquad (9)$$

$$COPcl = f(Tlo, Tmo, Lf) \qquad (10)$$

$$COPch = f(Tmi, Tho\_2, Lf) \qquad (11)$$

In Expression (9), COPcl is the coefficient of performance of a cascade-connected low-temperature heat source unit (a first heat-source-unit group), that is, the heat source unit $2a$ whose heat transmitting pipe Lm conects to the heat-source-water pipe La, and is calculated by using Expression (10). Also, in Expression (9), COPch is the coefficient of performance of a cascade-connected high-temperature heat source unit (a second heat-source-unit group), that is, the heat source unit 2b' whose heat transmitting pipe Lm conects to the heating-medium pipe Lb, and is calculated by using Expression (11).

In Expression (10), Tlo is the heat-source-water outlet temperature calculated in Step SB4, Tmo is the outlet temperature of the first heating medium calculated in Step SB5, and Lf is the heat-source-unit load factor calculated in Step SB2.

In Expression (10), Tmi is the inlet temperature of the first heating medium calculated in Step SB5, Tho_2 is the outlet temperature of the second heating medium, and Lf is the heat-source-unit load factor calculated in Step SB2.

As described above, the coefficient of performance COPc for when the cascade connection is included is calculated by using the coefficient of performance of the cascade-connected low-temperature heat source unit and the coefficient of performance of the cascade-connected high-temperature heat source unit.

Once the coefficient of performance COP for when the cascade connection is not included and the coefficient of performance COPc for the case that includes the cascade connection are calculated in this way, the computing portion 21 outputs these calculation results to the selecting portion 22.

The selecting portion 22 compares the coefficients of performance COP and COPc input from the computing portion 21 and selects the connection configuration having the larger coefficient of performance (from Steps SB8 to SB10 in FIG. 10).

Once the connection configuration is determined by executing the computation processing described above, the system control device 10a controls the pipe switching valves 9 and the four-way valve (not shown) of the heat source unit 2b' based on the determined connection configuration. By doing so, the refrigerant system shown in FIG. 7 is formed when the connection configuration that does not include the cascade connection is selected, and the refrigerant system shown in FIG. 8 is formed when the connection configuration that includes the cascade connection is selected.

As has been described above, with the heat source system according to this embodiment, the connection configuration of the heat source units can be switched between the connection configuration that does not include the cascade connection and the connection configuration that includes the cascade connection. Therefore, it is possible to select an appropriate connection configuration depending on, for example, the balance between the heat demand and the amount of heat supply. In this embodiment, because the coefficients of performance are calculated for the individual connection configurations, and the connection configuration having the highest coefficient of performance is selected, it is possible to select a suitable connection configuration from the viewpoint of the thermal efficiency.

In the above description, an example in which two heat source units 2a and 2b' are provided in the heat source system 1b has been described; however, three or more heat source units may be provided. In this case, the number of low-temperature units whose heat transmitting pipes Lm conect to the heat-source-water pipe La and the number of high-temperature units whose heat transmitting pipes Lm conect to the heating-medium pipe Lb are assumed to be arbitrarily changeable when employing the cascade connection. For example, in the case in which three heat source units are provided, the connection configuration thereof may be such that one low-temperature unit and two high-temperature units are included or that two low-temperature units and one high-temperature unit are included. Therefore, the above-described coefficients of performance are individually calculated for both of these connection configurations, and the connection configuration having the highest coefficient of performance, including the coefficient of performance for when the connection configuration does not include the cascade connection, should be selected.

When an operator inputs an instruction about the connection configuration, the pipe switching valves 9 and the four-way valve may be switched in accordance with the input connection configuration, without depending on the coefficients of performance.

In the above-described embodiment, although a case in which heating is performed in the heat source system has been described, the present invention can also be applied to the case in which cooling is performed. When performing cooling, the heat-source-water inlet temperature and the heat-source-water outlet temperature will be calculated at the computing portion 21 (see FIG. 9) by using different calculation formulas from those used in the case of heating described above. Specifically, instead of Expression (4) described above, the heat-source-water inlet temperature is calculated by using Expression (12), described below, and, instead of Expression (5) described above, the heat-source-water outlet temperature is calculated by using Expression (13), described below. Note that, because other computation formulas are the same as the case of heating described above, the calculations should be performed by referring to the above descriptions.

$$Tli = Tu\_sel + \Delta Tu\_sel \quad (12)$$

$$Tlo = Tli + \Delta Tl \times Lf \quad (13)$$

Figure 11:
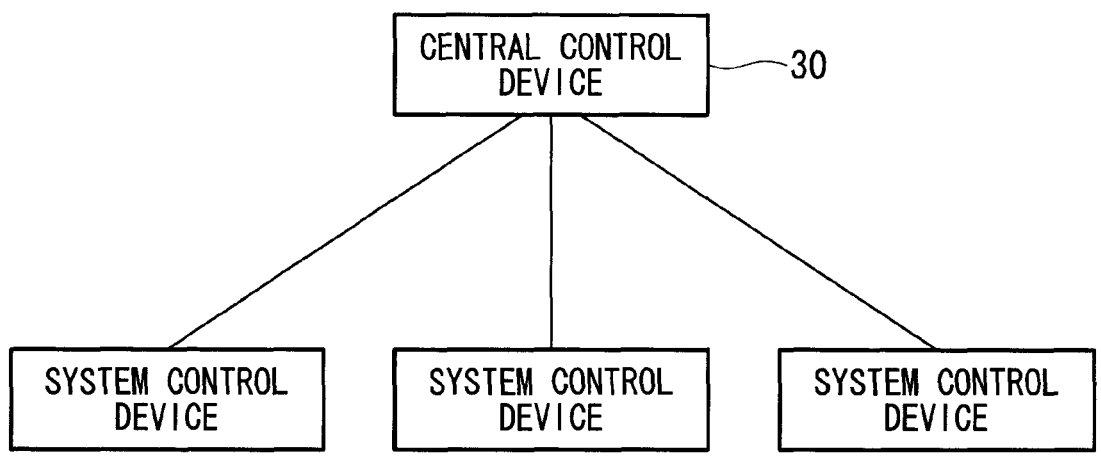
FIG. 11 is a diagram showing the configuration of an unused-heat utilization system according to an embodiment of the present invention.

In the individual embodiments described above, cases in which the selection of the heat sources and the selection of the connection configurations are independently performed in a heat source system installed in a facility have been described; however, as shown in FIG. 11, heat source systems in a predetermined area may be linked in a network, and a central control device 30 may be additionally provided so as to construct an unused-heat utilization system in which the usage states of unused heat are integrally managed for the plurality of heat source systems.

For example, as shown in FIG. 11, the central control device 30 is connected, via a communication medium, to the system control devices of the heat source systems according to any of the above-described embodiments that are installed in a predetermined region and use unused heat as heat sources thereof. The central control device 30 is a device that centrally manages the usage states of the unused heat (for example, sewage) in the predetermined region. The individual system control devices transmit, for example, the flow rate, the system inlet and outlet temperatures, and so forth for the unused heat used in the respective heat source systems to the central control device 30. On the basis of such information, the central control device 30 computes the potential temperatures, amounts of potential heat, and so forth for the individual facilities and transmits them to the individual system control devices.

In this way, potential management of the unused heat that has been performed in the individual heat source systems is expanded to the level of an area, and the state of the unused heat is collectively managed by the central control device 30 for the entire area, thus making it possible to provide a promising method of realizing effective application of the unused heat.

REFERENCE SIGNS LIST 1, 1b heat source system
2a, 2b, 2b' heat source unit
3 refrigerant circuit
4 first heat exchanger
5 compressor 6 second heat exchanger
7 wastewater tank
8 heat-source switching valve
9 pipe switching valve
10, 10a, 10b system control device
11, 11a heat-source selecting portion
12 potential determining portion
13 judging portion
14 scheduling portion
20 connection-configuration selecting portion
21 computing portion
22 selecting portion
30 central control device
La heat-source-water pipe
Lb heating-medium pipe
Lm heat transmitting pipe

The invention claimed is:

1. A heat source system comprising:
a plurality of heat source units can cool or heat a first heating medium by using heat-source water supplied from a plurality of heat sources;
a heating-medium pipe for circulating a second heating medium;
a heat-source-water pipe for circulating the heat-source water from the heat sources;
a heat transmitting pipe which is provided in a first heat exchanger for performing heat exchange between the heat-source water or the second heating medium and a circulating refrigerant in each of the heat source units, and configured to circulate the heat-source water or the second heating medium;
a pipe switching device for selectively switching the pipe to be connected to the heat transmitting pipe between the heat-source-water pipe and the heating-medium pipe, in some of the heat source units among the plurality of heat source units;
a circulation switching portion for switching a flow of the circulating refrigerant in said some of the heat source units; and
a connection-configuration controlling portion for switching between a connection configuration that includes a cascade connection and a connection configuration that does not include a cascade connection by controlling the pipe switching device and the circulation switching device wherein the connection-configuration controlling portion includes: a computing portion for calculating a coefficient of performance of the heat source system for when the cascade connection is included and a coefficient of performance of the heat source system for when the cascade connection is not included; and a selecting portion for selecting the connection configuration for which the coefficient of performance calculated by the computing portion is the highest, the connection-configuration controlling portion configured to control the pipe switching device and the circulation switching device in accordance with the connection configuration selected by means of the selecting portion.

2. The heat source system according to claim 1, wherein, when computing the coefficient of performance of the heat source system for when the cascade connection is included, the computing portion configured to calculate a coefficient of performance for a first heat-source-unit group formed of the heat source units in which the heat transmitting pipe connects to the heat-source-water pipe and a coefficient of performance for a second heat-source-unit group formed of the heat source units in which the heat transmitting pipe connects to the heating-medium pipe and to calculate the coefficient of performance of the heat source system by using the calculated coefficients of performance.

3. The heat source system according to claim 2, wherein the coefficient of performance of the first heat-source-unit group is computed by using predetermined computation formulas whose parameters include a heat-source-water outlet temperature, an outlet temperature of the first heating medium, and a heat-source-unit load factor, and
the coefficient of performance of the second heat-source-unit group is computed by using predetermined computation formulas whose parameters include a inlet temperature of the first heating medium, a outlet temperature of the second heating medium, and a heat-source-unit load factor.

4. The heat source system according to claim 2,
wherein the first heating medium produced in the first heat-source-unit group is supplied to air-conditioning equipment for heating purposes, and
the second heating medium produced in the second heat-source-unit group is supplied to hot-water supplying equipment.

5. The heat source system according to claim 3,
wherein the first heating medium produced in the first heat-source-unit group is supplied to air-conditioning equipment for heating purposes, and
the second heating medium produced in the second heat-source-unit group is supplied to hot-water supplying equipment.

6. The heat source system according to claim 1, wherein
a central control device that collectively manages a usage state of the unused heat around a facility in which the heat source system is installed,
wherein the central control device provides the heat source system with information including a potential temperature and amount of potential heat of the unused heat for the facility.

7. The heat source system according to claim 2, wherein
a central control device that collectively manages a usage state of the unused heat around a facility in which the heat source system is installed,
wherein the central control device provides the heat source system with information including a potential temperature and amount of potential heat of the unused heat for the facility.

8. The heat source system according to claim 3, wherein
a central control device that collectively manages a usage state of the unused heat around a facility in which the heat source system is installed,
wherein the central control device provides the heat source system with information including a potential temperature and amount of potential heat of the unused heat for the facility.

9. The heat source system according to claim 4, wherein
a central control device that collectively manages a usage state of the unused heat around a facility in which the heat source system is installed,
wherein the central control device provides the heat source system with information including a potential temperature and amount of potential heat of the unused heat for the facility.

10. The heat source system according to claim 5, wherein
a central control device that collectively manages a usage state of the unused heat around a facility in which the heat source system is installed, wherein the central control device provides the heat source system with information including a potential temperature and amount of potential heat of the unused heat for the facility.

11. The heat source system according to claim 5, further comprising: a heat-source selecting device that is employed in the heat source system in which the plurality of heat sources can be utilized and that selects a heat source to be used,
   wherein the plurality of heat sources include
      unused heat, and
      wastewater generated in a facility in which an external load that receives a supply of the first or the second heating medium heated or cooled in the heat source system is installed,
   the heat-source selecting device comprising:
      a potential determining portion for determining potential temperatures that serve as evaluated values related to temperatures of the individual heat sources and amounts of potential heat that serve as evaluated values related to amounts of heat of the individual heat sources; and
      a judging portion for identifying heat sources having the amounts of potential heat higher than a threshold set in advance; for selecting, from among the identified heat sources, the heat source having the highest potential temperature, in the case of heating purposes; and for selecting, from among the identified heat sources, the heat source having the lowest potential temperature, in the case of cooling purposes.

12. The heat source system according to claim 11, further comprising:
   a scheduling portion for storing information in which at least one of the heat sources is associated with a preferential-use period thereof, the preferential-use period being a period in which the corresponding heat source is preferentially selected,
   wherein the judging portion is configured to select the heat sources based on the information stored in the scheduling portion.

13. The heat source system according to claim 12, wherein an additional heat source is used in combination when the temperature of the heating medium does not reach a target temperature set in advance during the preferential-use period.

14. A heat-source selecting method, employed in a heat source system according to claim 1 in which a plurality of heat sources can be utilized, for selecting a heat source to be used,
   wherein the plurality of heat sources include
      unused heat, and
      wastewater generated in a facility in which an external load that receives a supply of heating medium heated or cooled by using the heat sources is installed,
   the heat-source selecting method comprising:
      a potential determining step of determining potential temperatures that serve as evaluated values relating to temperatures of the individual heat sources and amounts of potential heat that serve as evaluated values relating to amounts of heat of the individual heat sources; and
      a judging step of identifying heat sources having the amounts of potential heat higher than a minimum threshold set in advance, of selecting, from among the identified heat sources, the heat source having the highest potential temperature, in the case of heating purposes, and of selecting, from among the identified heat sources, the heat source having the lowest potential temperature, in the case of cooling purposes.

\* \* \* \* \*